United States Patent [19]

Hurlock et al.

[11] 4,120,840

[45] Oct. 17, 1978

[54] PHOSPHORUS ACID TO STABILIZE QUATERNIZED POLYACRYLAMIDE

[75] Inventors: John R. Hurlock, Hickory Hills; Edward G. Ballweber, Glenwood, both of Ill.

[73] Assignee: Nalco Chemical Company, Oak Brook, Ill.

[21] Appl. No.: 763,477

[22] Filed: Jan. 28, 1977

[51] Int. Cl.$^2$ ............................................. C08L 61/20
[52] U.S. Cl. ................... 260/29.4 UA; 260/29.6 WQ; 260/29.6 HN; 260/29.6 MP; 526/16; 526/55
[58] Field of Search ............... 260/29.6 WQ, 29.6 HN, 260/29.6 MP, 29.4 UA, 67 FP

[56] References Cited

U.S. PATENT DOCUMENTS

| | | | |
|---|---|---|---|
| 3,284,393 | 11/1966 | Vanderhoff et al. | 526/911 |
| 3,624,019 | 11/1971 | Anderson | 260/29.6 HN |
| 3,734,873 | 5/1973 | Anderson et al. | 260/29.6 HN |
| 3,830,655 | 8/1974 | Rothwell et al. | 427/121 |
| 3,988,277 | 10/1976 | Witschonke et al. | 260/29.6 CM |
| 4,010,131 | 3/1977 | Phillips et al. | 260/29.4 UA |
| 4,073,763 | 2/1978 | Tai | 260/29.4 UA |

FOREIGN PATENT DOCUMENTS 976,671 10/1975 Canada.

OTHER PUBLICATIONS

"Formaldehyde" by Walker, pp. 256-257; Reinhold Publ. Corp., London, Eng., 1964.

Primary Examiner—Melvyn I. Marquis
Attorney, Agent, or Firm—John G. Premo; Robert A. Miller; Barry W. Sufrin

[57] ABSTRACT

A method for the stabilization of both water-in-oil emulsions and solutions of poly trimethylamino methylol acrylamide is disclosed. The process consists of adding to the water-in-oil emulsion or solution containing the polymer from 10-50 mole percent of orthophosphorus acid based on the weight of the polymer. Water-in-oil emulsions of polymer are then stabilized by heating the emulsion for a period of time to obtain a stabilized emulsion of a water-soluble quaternary salt of poly trimethylamino methylol acrylamide. Solutions of poly trimethylamino methylol acrylamide need not be heated and are stablized by the addition of the orthophosphorus acid and mixing.

7 Claims, No Drawings

PHOSPHORUS ACID TO STABILIZE QUATERNIZED POLYACRYLAMIDE

INTRODUCTION

This invention relates to a new and improved method for the stabilization of polymers both in solution and water-in-oil emulsion form of poly trimethylamino methylol acrylamide. Solutions of polymers of this type are known in the art as witnessed by U.S. Pat. No. 3,830,655 and Canadian Pat. No. 976,671. Water-in-oil emulsions containing these polymeric materials are also generally known, as seen by application Ser. No. 560,435 filed Apr. 18, 1975 to the same assignee as the instant application now U.S. Pat. No. 4,010,131. While this invention discloses quaternary polymers similar to those of the instant invention, these products tended to be unstable and when stabilized with agents such as sulphurous acid or its water-soluble salts, tends to have a very objectionable odor due to the volatility of sulfur dioxide and did not have sufficient storage stability due to the loss of stabilizing agent to the atmosphere during storage.

The stabilization of quaternary salts of polyacrylamide has been of much concern due to the usefulness of polymers of this type. Various stabilization agents have been suggested including the use of amine compounds such as those found in U.S. Pat. No. 3,988,277 and sulphurous acid and its water-soluble salts in Ser. No. 560,435 mentioned above. However, these stabilization agents have been unsatisfactory due to the fact that scavenging agents have been ineffective for formaldehyde which apparently causes storage instability. With the stabilizing agents prepared in the prior art, stoage stability has often been relatively low and the odor of the scavenging agent has often been objectionable. We have now found that both aqueous solutions and water-in-oil emulsions of poly trimethylamino methylol acrylamide can be stabilized by adding to the polymer in either solution or latex form after the initial cationically modified polymer is formed, from 10-50 mole percent of orthophosphorus acid. In the case of water-in-oil emulsions of finely divided poly trimethylamino methylol acrylamide, the material must be heated for a period of time necessary to stabilize and react free and possibly bound formaldehyde within the emulsion. In the case of aqueous solutions of the polymer, the orthophosphorus acid need only be added and mixed sufficiently. The method of our invention provides an odorless and effective formaldehyde scavenger which differs greatly from the prior art. Furthermore and of great importance, the stability of polymers of this type is greatly enhanced by the addition of the orthophosphorus acid. The use of orthophosphorus acid scavenger does not effect the stability of water-in-oil emulsions of this type, and the ability of the final product, in the case of a water-in-oil emulsion to be successfully inverted into water, is not effected by the use of this technique.

OBJECTS

It is, therefore, an object of this invention to provide a method for effectively stabilizing water-soluble quaternary modified acrylamide polymers.

Another object of this invention is to provide a method for stabilizing water-in-oil emulsions of finely divided poly trimethylamino methylol acrylamides.

A further object of this invention is to provide a method for stabilizing water-in-oil emulsions of finely divided water-soluble quaternary salts of poly trimethylamino methylol acrylamides by the addition of the emulsion of from 10–50 mole percent orthophosphorus acid based on the moles of the quaternary salt of poly trimethylamino methylol acrylamide present in the emulsion.

A still further object of this invention is to provide a method for stabilizing aqueous solutions containing water-soluble quaternary salts of poly trimethylamino methylol acrylamide by the addition to the solution of from 10–50 mole percent orthophosphorus acid based on the moles of the quaternary salt of poly trimethylamino methylol acrylamide present in the solution.

Other objects will appear hereinafter.

THE INVENTION

This invention basically encompasses a method for the stabilization of water-in-oil emulsions of finely divided water-soluble quaternary salts of poly trimethylamino methylol acrylamide of the type comprising:
1. 5–70% by weight of the emulsion of a hydrophobic liquid;
2. 0.1–21% by weight of the emulsion of a water-in-oil emulsifying agent;
3. 10–50% by weight of the emulsion of the quaternary salt of poly trimethylamino methylol acrylamide; and
4. 30–95% by weight of the emulsion of an aqueous phase consisting of the polymer and water;

said polymer further characterized as having a particle size of from 0.1 microns to 10 microns within the emulsion; the method which comprises:
5. Adding with mixing to said water-in-oil emulsion from 10–50 mole percent of orthophosphorus acid based on the quaternary salt of poly trimethylamino methylol acrylamide in said emulsion so as to adjust the pH of said emulsion to a level of from 3.0–5.5;
6. Heating the resultant water-in-oil emulsion to a temperature of from about 40°–90° C. for about 2–20 hours; and then,
7. Recovering a stabilized water-in-oil emulsion of the quaternary salt of poly trimethylamino methylol acrylamide.

The invention also encompasses the stabilization of aqueous solutions of poly trimethylamino methylol acrylalmide utilizing a method which comprises:
1. Adding with mixing to an aqueous solution containing 5–50% by weight of a water-solulbe quaternary salt of poly trimethylamino methylol acrylamide, from 10–50 mole percent of orthophosphorus acid based on the quaternary salt of poly trimethylamino methylol acrylamide present in said solution so as to adjust the pH of said solution to a level of from 3.0–5.5;
2. Recovering a stabilized aqueous solution of the quaternary salt of poly trimethylamino methylol acrylamide.

The method of this invention involves a method for preparing water-in-oil emulsions and aqueous solutions of water-soluble quaternary salts of poly trimethylamino methylol acrylamides which are stable. The general method for obtaining these emulsions and solutions is discussed in Ser. No. 560,435 filed Apr. 18, 1975, now U.S. Pat. No. 4,010,131 which is hereinafter incorporated by reference. However, in order to fully disclose the instant invention, the formation of both waterin-oil emulsions of this type and solutions will be discussed briefly.

THE AQUEOUS SOLUTIONS OF ACRYLAMIDE POLYMER

The aqueous solutions of acrylamide polymers as used in this invention should contain from 10–50% by weight of an acrylamide polymer. The molecular weights of these polymers are reasonably low having intrinsic viscosities of from approximately 0.1 to 0.5, and most preferably from 0.1 to 1.0. The acrylamide polymers, as used in the subject of this invention when referring to aqueous solutions, may be homopolymers of acrylamide or copolymers of acrylamide with other water-soluble monomers. By water-soluble monomers it is meant those monomers having at least 5 weight percent solubility in water and which when polymerized with acrylamide will produce a water soluble polymeric product. When copolymers are used, at least 20% and preferably 75% by weight of acrylamide or other water-soluble monomers with amide functionality is utilized. Examples of other water-soluble monomers include: acrylic acid, methacrylic acid, itaconic acid, and acrylonitrile.

The aqueous solution of acrylamide polymer is typically made by polymerizing acrylamide or acrylamide and other water-soluble monomers in aqueous solutions. While suitable chain transfer agents may be utilized to hold down the molecular weight, they may or may not be utilized in any particular preparation. Suitable free radical catalyst utilized to prepare polymers of this type include: red-ox pairs; peroxides, hydroperoxides; and more sophisticated organic radicals such as azobisisobutyronitrile. Typically, the solutions of polyacrylamide contain from 1–48% by weight acrylamide, and preferably from 20–30% of the acrylamide polymer by weight. In the practice of our invention, we have found it particularly beneficial to polymerize acrylamide in the presence of small amounts of isopropanol using a red-ox catalyst system. When using a chain transfer agent of the above type, care should be taken to distill isopropanol from the solution prior to any further reaction. Since the method of making the solution polymers are generally well known in the art, it is not believed that further explanation is necessary.

THE WATER-IN-OIL EMULSIONS

The polymer emulsions which are reacted to produce the quaternary salt of poly trimethylamino methylol acrylamide are those generally prepared according to Anderson, et al., U.S. Pat. No. 3,624,019 and 3,734,873, both of which hereinafter incorporated by reference. These polymer emulsions are stable yet at the same time contain relatively large amounts of polymer. The polymers dispersed in the emulsion are quite stable when the particle size of the polymer is within the range of 0.1 micron up to about 10 microns and preferably from 0.2 micron to 2 microns. The preferred particle size is within the range of 0.5 micron and 1.0 micron.

The stable water-in-oil emulsion comprises:
1. An aqueous phase;
2. A hydrophobic liquid; and
3. A water-in-oil emulsifying agent.

The polymer-containing emulsion of this invention is comprised of an aqueous phase ranging between 30–95% by weight of the emulsion. The aqueous phase is defined as the sum of the polymer or copolymer and the water present in the composition. The preferred range is between 70–95% by weight of the emulsion. The most preferred range is between 70–80% by weight of the emulsion.

The present invention has a polymer concentration between 10–50% by weight of the emulsion. A preferred range is between 25–40% by weight of the emulsion. The most preferred range is between 25–35% by weight of the emulsion.

The polymers most commonly used in the application of this invention are acrylamide polymers which include polyacrylamide and its water-soluble copolymeric derivatives such as, for instance, acrylic acid, methacrylic acid, itaconic acid, acrylonitrile, and styrene. The copolymers contain from about 5–95% by weight of acrylamide. The molecular weights of such polymers and copolymers exceed 500,000. While this molecular weight may serve as a guide, it has been found that polymeric emulsions also can be prepared from polymers having a lower molecular weight as well. Oftentimes, this will not be economically advantageous since with the lowering of molecular weight, solution viscosity decreases with the result being that aqueous solutions of these lower molecular weight polymers are often preferred.

The preferred polymers have use in this invention when contemplating water-in-oil emulsions of polyacrylamides have a molecular weight of from 500,000 to 15 million. Generally, polymers useful in preparing the quaternary salt of poly trimethylamino methylol acrylamide have intrinsic viscosities as measured in 0.1N $NaNO_3$ of from 5.0–17.0 and higher.

The organic or oil phase of the emulsion is comprised of an inert hydrophobic liquid. The hydrophobic liquid comprises between 5–70% by weight of the emulsion. The preferred range is between 5–30% by weight of the emulsion. The most preferred range is between 20–30% by weight of the emulsion.

The oils used in preparing these emulsions may be selected from a large group of organic liquids which include liquid hydrocarbons and substituted liquid hydrocarbons. A preferred group of organic liquids are hydrocarbon compounds, which contain from 4–8 carbon atoms. Thus, such organic hydrocarbon liquids as benzene, xylene, toluene, mineral oils, kerosenes, naphtha, and in certain instances, petroleums may be used. A particularly useful oil from the standpoint of its physical and chemical properties is the ranchchain isoparaffinic solvent sold by Humble Oil and Refinery Company under the tradename "Isopar M." Typical specifications of this narrow-cut isoparaffinic solvent are set forth below in Table I.

TABLE I

| Specification Properties | Minimum | Maximum | Test Method |
|---|---|---|---|
| Gravity, API at 60/60° F | 48.0 | 51.0 | ASTM D 287 |
| Color, Saybolt | 30 | — | ASTM D 156 |
| Aniline point, ° F | 185 | — | ASTM D 611 |
| Sulfur, ppm | — | 10 | ASTM D 1266 (Nephelometric mod.) |
| Distillation, ° F | | | |
| IBP | 400 | 410 | |
| Dry point | — | 495 | |
| Flash point, ° F (Pensky-Martens closed cup) | 160 | — | ASTM D 93 |

Any conventional water-in-oil emulsifying agent can be used such as sorbitan monostearate, sorbitan monooleate, and the so-called low HLB materials which are all documented in the literature and are summarized in the Atlas HLB Surfactant Selector. Although the mentioned emulsifiers are used in producing good waer-in-oil emulsions, other surfactants may be used as long as they are capable of producing these emulsions. The water-in-oil emulsifying agent is usually present in amounts ranging between 0.1 and 21.0% by weight of the emulsion. The preferred range is between 1.0 and 15.01% by weight of the emulsion. The most preferred range is between 1.2 and 10% by weight of the emulsion.

In the choice of a suitable emulsifier, it is important to take into account variations in monomer solubility, salt content, and the reactivity of monomer groups. Also, variations may occur which dictate that emulsifiers should be tried on a case-by-case method.

The polymers contemplated for use in this invention may be synthesized in emulsion form as described in Vanderhoff et al., U.S. Pat. No. 3,284,393 which is hereby incorporated by reference. The polymerization technique set forth in Vanderhoff is generally followed in preparing polymeric latexes used in this invention.

Also contemplated in the practice of this invention is the preparation of suitable water-in-oil emulsions of water-soluble polymers by the methods described in Anderson et al., U.S. Pat. Nos. 3,624,019 and 3,734,873, both of which are hereby incorporated by reference.

THE MANNICH BASE INTERMEDIATE

In order to prepare the cationically modified acrylamide polymer discussed above, the water-in-oil emulsion or aqueous solution of a polyacrylamide type polymer is reacted with formaldehyde and a lower aliphatic secondary amine containing 2–8 carbon atoms. Oftentimes, this reaction is conducted with a premix of the formaldehyde and secondary amine which is added directly to the water-in-oil emulsion of the acrylamide polymer at ambient or slightly elevated temperatures. As another method, either reactant, formaldehyde, or secondary amine may be added separately in any order to the water-in-oil emulsion or solution of the acrylamide polymer. Alternatively, the reactants can be added simultaneously to the water-in-oil emulsion or solution of the acrylamide polymer with mixing thereby producing a poly N,N dialkyl amino methylol acrylamide.

The secondary amines useful in this invention are those that contain 2–8 carbon atoms with dimethyl amine being the preferred secondary amine. Other secondary amines which may find usefulness in this invention include: methylethylamine, morpholine, diethylamine, piperidine, diisopropylamine and dibutylamine. The amines used can be aliphatic or cyclic, straight chained, or branched. Secondary amines falling into the above description can also contain other functional groups. It is only important that the amine contain the above carbon atom limitation, and be a secondary amine. Examples of materials that fall into this class include diethanolamine, dimethanolamine, and diisopropanolamine. The ratio of formaldehyde to secondary amine may vary over a wide range with the preferred mole ratio being within the range of 1:2 to 1:.9. Typically, it is oftentimes advisable to have a slight molar ratio excess of the amine present when adding this material to the polymers so as to inhibit cross-linking in later steps. In the addition of these reactants to the water-in-oil emulsion or aqueous solution of the acrylamide polymer it is preferable and desirable to use solutions which are as concentrated as possible. This is to avoid excess dilution of the water-in-oil emulsion or solution and to maintain a concentrated product.

Due to the possibility that formaldehyde added to the emulsion or aqueous solution may not react with the acrylamide, resulting in unreacted formaldehyde which can lead to a crosslinked polymer, a slight excess of secondary amine is generally preferred in the practice of this invention. Generally, the ratio of formaldehyde: secondary amine ranges from 1:1 to 1:1.5 and preferably from 1:1 to 1:1.3.

The formaldehyde and secondary amine are added to the water-in-oil emulsion or solution of the acrylamide polymer in a mole ratio of formaldehyde:secondary amine:polymer of preferably 1.0:1.0:1.0 to 1.0:1.3:1.0. While the above ratio can be modified slightly and still be within the intent and spirit of this invention, the above ratio provides a fully Manniched polyacrylamide which is useful as a precurser to prepare the poly trimethylamino methylol acrylamide quaternary. It is to be pointed out that we do not wish to be limited to only those polymers having the above mole ratios, and it will be seen that as much or as little of the formaldehyde and secondary amine can be added to the water-in-oil emulsion or solution of the acrylamide polymers as desired. As a brief example, it would be possible to prepare a 50:50 poly dimethylamino methylol acrylamide-acrylamide polymer by adding only a half mole each of formaldehyde and secondary amine (dimethylamine) for each mole of amide functionality present on an acrylamide polymer. The reaction of the secondary amine and formaldehyde with acrylamide is rapid and is well known to those skilled in the art.

References describing the reaction of polyacrylamide to prepare the corresponding Mannich base include Wisner, U.S. Pat. No. 3,539,535 and especially Ballweber, et al., U.S. Pat. No. 3,979,348, both of which are hereinafter incorporated by reference.

Occasionally, when working with water-in-oil emulsions, due to the characteristics of a particular water-in-oil emulsion of the finely divided acrylamide polymer utilized, it will sometimes be necessary to add more oil and/or emulsifier to the latex in order to maintain stability when the formaldehyde and secondary amine are added. It should be pointed out, however, that this can be done during the manufacture of the starting material and, of course, this excess oil and/or emulsifier will only be needed in some specific cases. When more oil is added, it will generally range from 5–20% excess, although, it will still fall within the range for the oil phase as set forth above. When adding more emulsifier, the emulsifier will generally be added at a level of from 2–10% by weight of the polymer present, although, again the total emulsifier level will fall within the figures previously stated for the acrylamide emulsion.

THE QUATERNIZED MANNICH BASES

Once the water-in-oil emulsion or solution of the poly dimethylamino methylol acrylamide is prepared, it is then quaternized using well-known reactants. Examples of these reactants include but are not limited to dimethyl sulfate, methyl chloride, and methyl bromide. The preferred quaternizing agent for use in this invention is methyl chloride due to its low cost, commercial availability, and ease of quaternization.

When selecting a quaternizing agent, care should be taken in selecting it due to the residual presence of the anion of the agent in the completed product. For example, when methyl chloride is used as the quaternizing agent, the chloride will be present as the anion for the quaternary ammonium salt prepared. The mole ratio of quaternizing agent to the tertiary amine functionality present on the acrylamide polymer can vary greatly. Ratios of 2:1 to 0.01:2 are contemplated within this invention.

Generally, the quaternizing agent is added to the emulsion or solution on a 1:1 basis with the number of moles of Mannich amine present plus the number of moles of any excess secondary amine present. This will insure a relatively complete quaterniziation with yields of quaternary material in excess of 85–95% being expected.

Before adding the quaternizing agent to the latex or solution, it is oftentimes advisable to buffer this material at a slightly alkaline pH. In this invention, pH values of from 7–10 are contemplated. This can be accomplished by adding a buffer solution able to hold this pH to the latex. These buffer solutions are generally weak bases which are stabilized with weak acids such as phosphorus acid. An example of such a buffer system in the polymer emulsion or solution would be 5 mole percent sodium carbonate stabilized with 5 mole percent phosphorus acid and neutralized to pH 8.5–9.2 with 50 mole percent carbon dioxide. Either $Na_2CO_3$, $H_3PO_3$ or $CO_2$ or any combination will work within this invention, but $CO_2$ appears to work best. However, if more secondary amine is added after the quaternization step, none of the above are necessary. The base in this case aids in the neutralization of any acids formed during the quaternization reaction and furthermore stabilizes the dimethylamine and formaldehyde present in the latex. As it will be seen by those skilled in the art, other buffer systems can be used and either sodium carbonate, or $CO_2$ mentioned above, can be used together or alone to achieve this effect.

After the water-in-oil emulsion or aqueous solution of poly dimethylamino methylol acrylamide has been adjusted to the above pH values, the quaternization reaction may be undertaken. This is accomplished by adding the quaternizing agent to the latex or solution with agitation and then holding the reaction mixture until the quaternization is complete. The quaternization can be conducted at temperatures ranging from 20°–70° C., although, the temperature of this quaternization step is not a critical factor. Generally, quaternizations are conducted at temperatures of from 20°–40° C., for periods of time ranging from 2–24 hours. The time necessary to achieve quaternization will depend on, among other things, the molecular weight of the polyacrylamide backbone polymer.

When using methyl chloride, it may be desirable to conduct the quaternization reactions in a vessel equipped for pressurized operations. The quaternization itself can be conducted at temperatures ranging from 0°–60° C., although, a rapid reaction is generally obtained at ambient temperatures. The resulting product so obtained is a stable water-in-oil emulsion or aqueous solution of the quaternary salt of poly trimethylamino methylol acrylamide.

For somewhat unexplainable reasons which are not completely aware to use at this time, the resulting polymeric product when prepared in water-in-oil emulsion form may tend to be insoluble when inverted into water. Also, upon standing, cross-linking with unreacted formaldehyde may also yield an insoluble product in both solution and emulsion forms.

THE STABILIZATION

The resultant quaternized water-in-oil emulsions and aqueous solutions of poly trimethylamino methylol acrylamide are stable but at the same time contain unreacted formaldehyde and possibly methylol acrylamide linkages which can later cross-link the resultant polymer and render it water insoluble. We have found that an excellent formaldehyde scavenger which is non-volatile and which does not impart any undesirable properties to either the water-in-oil emulsions or the aqueous solutions of poly trimethylamino methylol acrylamide is phosphorus acid. The addition of from 5–80 mole percent, and preferably 10–50 mole percent, of this material to either the emulsion or solution appears to satisfactorily stabilize both materials allowing for long storage times while maintaining the product in an active form. There is no upper limit on $H_3PO_3$ provided it is neutralized with some base (dimethylamine or $NH_3$) so that the pH does not go below 3. Levels as high as 75–80 mole percent have been used successfully.

When the phosphorus acid is added to the solution, only mixing need be employed to stabilize the aqueous solution of the quaternary modified polyacrylamide. When this material is added to the water-in-oil emulsion of the quaternary modified polyacrylamide, the water-in-oil emulsion should be heated at temperatures ranging from 30°–90° C. for periods of time possibly dependent on the molecular weight of the starting backbone. We do not understand why this heating step is necessary for the water-in-oil emulsion but not the solution. While the above percentages of phosphorus acid which are to be added to the polymeric material should be used as a guide, the pH of either the water-in-oil emulsion or the aqueous solution of the poly trimethylamino methylol acrylamide and not the amount of phosphorus acid is the most important factor effecting the stability of the resultant polymer.

While it is not completely understood, it is believed in order for the stabilization of this invention to take place a slight excess of the secondary amine must be present. It is immaterial at what stage the secondary amine is added so long as there is a slight molar excess that is unreacted with formaldehyde prior to the stabilization reaction. While some stabilization will occur without an excess of secondary amine, it is the preferred embodiment of this invention that excess secondary amine be present. This secondary amine can be added at any place in the process, although, it is oftentimes advantageous to add the secondary amine during the Mannich step to avoid the further handling of this material in later steps. While it is not known definitely, it is speculated the mechanism of the stabilization may involve a reaction between the formaldehyde, secondary amine, and phosphorus acid.

The pH of stabilized latices and stabilized aqueous solutions should range from 3.0–5.5 and preferably from 4.5 to 5.0 to obtain stable polymer products. It is especially important for the water-in-oil emulsion materials that their pH is adjusted within this range to insure that when these emulsion are inverted, the polymeric product is water soluble. The amount of phosphorus acid to be added to the system is not exact and can be affected by the following variables:

A. Other acids in the phosphorus acid (impurities);
B. Amount of sodium carbonate buffer added (if any);
C. Quaternization time or amount of Mannich amine present in the quaternized polymer product;

D. Excess dimethylamine.

When only one level of phosphorus acid stabilizer was added to activate the polymer, each of the above appeared to affect the solubility of the polymer because each can effect the pH of the resultant polymer emulsion. The molecular weight of the backbone polyacrylamide also appears to be an important variable affecting the solubility of the stabilized polymer.

In order to illustrate this invention the following examples are presented:

EXAMPLE I

Seven polyacrylamide backbone latices having varied intrinsic viscosities ranging from 3.7 dl/gm to 17 dl/gm were prepared according to the procedure outlined in U.S. Pat. No. 3,734,873 and were reacted with formaldehyde and dimethylamine using a 20% excess of dimethylamine at 30° C. The resultant polymer emulsions were then buffered with 5 mole percent $Na_2CO_3$, stabilized with 5 mole percent $H_3PO_3$, and neutralized to a pH between 8–9 with 50 mole percent $CO_2$, before quatting the methyl chloride for 19 hours at 30° C. Each freshly prepared quat was then divided into three or four fractions, and each fraction was adjusted to a pH ($\pm 0.5$) of 5, 4, 3, or 2 by incremental addition of from 37.5 mole percent up to 62.5 mole percent phosphorus acid. Finally, each sample was activated by placing a sealed bottle of latex in a 60° C. or 90° C. oven for 2, 4, or 20 hours.

At the optimum latex pH of 4.5–5.0, which required 37.5 mole percent to 44 mole percent $H_3PO_3$ stabilizer, Mannich Quats on all backbones up to 17 dl/gm could be activiated in $\leqq 2$ hours at 90° C. or in $\leqq 20$ hours at 60° C. When more than 44 mole percent acid was added, and the latex pH was between 3–4.5, the activation (heating) time required generally increased with the molecular weight of the backbone in the manner outlined in Table II below.

TABLE II

| Backbone Intrinsic dl/gram | Activation Time at 90° C | | | | |
|---|---|---|---|---|---|
| | pH 3 | pH 3.5 | pH 4 | pH 4.5 | pH 5 |
| 3.7 | — | 2 hr | — | 2 hr | — |
| 5.2 | 20 hr | — | 4 hr | 2 hr | 2 hr |
| 6.2 | 20 hr | 4 hr | — | 2 hr | — |
| 8.9 | — | — | 4 hr | — | 2 hr |
| 9.1 | — | — | — | 4 hr | 2 hr |
| 17.0 | 20 hr | — | — | 2 hr | — |

EXAMPLE II

| Acrylamide emulsion recipe: | | |
|---|---|---|
| Isopar M | 156.0 | Grams |
| Sorbitan Monooleate | 8.25 | Grams |
| Water | 206.7 | Grams |
| Acrylamide | 142.0 | Grams |
| Sodium salt of N,N ethylene diamine tetraacetic acid | 0.05 | Grams |
| Isopropanol | 3.12 | Grams |
| 2,2 azobis (isobutylnitrile) | 0.2 | Grams |

The sorbitan monooleate was dissolved in the Isopar M and the resulting solution was poured into a one liter glass reactor fitted with a stirrer, thermometer, and nitrogen purge. The monomer was prepared by dissolving the acrylamide, the sodium salt of N,N ethylene diamine tetraacetic acid, and the isopropanol in the water. The monomer solution was added to the organic phase with agitation at 900rpm. The reactor was purged for 30 minutes with 1000 cc/min. of nitrogen after which time the 2,2 azobis (isobutylnitrile) dissolved in toluene was added to the mixture. The emulsion was heated to 53° C. for four hours after which the emulsion was heated to 75° L C. for one additional hour. The resulting product was a stable emulsion.

EXAMPLE III

To the emulsion produced in Example II was added 15.4g of sorbitan monooleate and 127.6g of Isopar M with agitation to produce a stable water-in-oil emulsion. 180g of 60% aqueous dimethylamine and 162.6g of 36.9% aqueous formaldehyde were added simultaneously to this emulsion over a one hour period with agitation at room temperature. The mixture was then heated to 30° C. for three hours with agitation to produce a water-in-oil emulsion of a finely divided cationically modified acrylamide polymer.

EXAMPLE IV

To the emulsion produced in Example III was added 10.6g of $Na_2CO_3$ in 27g of deionized water followed by 8.2g of $H_3PO_3$ in 3g of deionized water followed by 44g of carbon dioxide gas. This mixture was agitated for three hours at room temperature to produce a water-in-oil emulsion of poly dimethylaminomethylol acrylamide buffered at a pH of 8.5.

EXAMPLE V

The emulsion produced in Example IV was charged to an auto clave and 101g of methyl chloride was then added to the emulsion over a three hour period with agitation at room temperature. The mixture was then heated at 30° C. for 16 hours to produce a water-in-oil emulsion of the chloride salt of poly trimethylaminomethylol acrylamide. The above emulsion could be readily inverted into water to form an aqueous solution. However, the polymer in the above emulsion was thermally unstable and became insoluble in water if the emulsion was heated to $\geqq 60°$ C. for $\leqq 4$ hours.

EXAMPLE VI

To the emulsion produced in Example V and with agitation over a 2–3 hour period would be added phosphorus acid to a pH of 4.5. Approximately 38 mole percent phosphorus acid based on the moles of polymer and depending upon the excess dimethylamine present would be necessary. After the addition of the phosphorus acid, the water-in-oil emulsion would be heated to a temperature of 90° C. for a period of approximately 2 hours. A stable water-in-oil emulsion would be recovered at the end of this time which would be storage stable over an extended period of time and which would contain finely divided particles of the quaternary (chloride) of poly trimethylaminomethylol acrylamide. The polymer would remain stable for several months at room temperature and would be highly cationically charged as determined by colloid titration. The resultant polymer when inverted into water would be highly active in the dewatering of sludge and in certain papermaking operations. The polymer emulsion would have no objectionable odor.

EXAMPLE VII

To a 1 l. round bottom flask equipped with stirrer, condenser, and thermometer would be charged 120.0 g of acrylamide monomer, 400.0g of deionized $H_2O$ and 100.0g of isopropanol. The mixture would be heated to 80° C. at which time 8 ml. of a 20% solution of potassium persulfate would be added. The reaction would be exothermic for approximately 10 minutes, and would then be held at 80° C., with heating for 2 hours. Following this period, 100 ml. of isopropanol would be removed by distillation. The resulting product would be a clear solution, having a Brookfield viscosity of around 100 cps and having a polymer concentration of 22.7%.

EXAMPLE VIII

To 100.0g of the polymer prepared in Example VII would be added a mixture of 26.0g of 37% formaldehyde and 24.0g of a 60% solution of dimethylamine. The mixture would be stirred for one hour at which time 16.50g of gaseous methylchloride and 3.4g of $Na_2CO_3$ would be added. The mixture would be heated to 30° C. for 2 hours and cooled. The resulting aqueous solution of poly trimethylamino methylol acrylamide would be clear.

EXAMPLE IX

To the material prepared in Example VIII would be added 30 mole percent of technical grade orthophosphorus acid. The resultant solution would have a pH of 4.7.

The aqueous stabilized solution of poly trimethylamino methylol acrylamide chloride would remain stable for several months at room temperature and would be highly cationically charged as determined by analytical techniques. The resultant polymer when added to water would be an effective oil-in-water emulsion breaker, and would also be active as a water clarification additive. While the resultant solution would have a slight odor of dimethylamine, the product would be judged satisfactory for use in industrial operations.

We claim:

1. A method for the stabilization of water-in-oil emulsions of finely divided water-soluble quaternary salts of poly trimethylamino methylol acrylamide of the type comprising:
   A. 5–70% by weight of the emulsion of a hydrophobic liquid;
   B. 0.1–21% by weight of the emulsion of a water-in-oil emulsifying agent;
   C. 10–50% by weight of the emulsion of the quaternary salt of poly trimethylamino methylol acrylamide; and,
   D. 30–95% by weight of the emulsion of an aqueous phase consisting of the polymer and water;
   said polymer further characterized as having a particle size of from 0.1 microns to 10 microns within the emulsion; the method which comprises:
   E. Adding with mixing to said water-in-oil emulsion from 5–80 mole percent of orthophosphorus acid based on the quaternary salt of poly trimethylamino methylol acrylamide present in said emulsion so as to adjust the pH of said emulsion to a level of from 3.0–5.5;
   F. Heating the resultant water-in-oil emulsion to a temperature of from about 60°–90° C. for about 2–20 hours; and then,
   G. Recovering a stabilized water-in-oil emulsion of the quaternary salt of poly trimethylamino methylol acrylamide.

2. The method of claim 1 wherein the quaternary salt is a halide selected from the group consisting of chloride and bromide.

3. The method of claim 1 wherein from 10–50 mole percent of orthophosphorus acid based on the quaternary salt of poly trimethylamino methylol acrylamide present in the emulsion is added to the water-in-oil emulsion in step E.

4. A stabilized water-in-oil emulsion of a water soluble quaternary salt of poly trimethylamino methylol acrylamide said stabilized water-in-oil emulsion of a water soluble quaternary salt of poly trimethylamino methylol acrylamide being prepared by the steps which comprise:
   A. Preparing a water-in-oil emulsion of poly trimethylamino methylol acrylamide said water-in-oil emulsion comprising:
      1. 5–70% by weight of a hydrophobic liquid;
      2. 0.1–21% by weight of a water-in-oil emulsifying agent;
      3. 20–95% by weight of an aqueous phase consisting of water and poly trimethylamino methylol acrylamide;
      4. 10–50% by weight of the emulsion of a quaternary salt of poly trimethylamino methylol acrylamide; and,
   B. Adding with mixing to said water-in-oil emulsion from 5–80 mole percent of orthophosphorus acid based on the quaternary salt of poly trimethylamino methylol acrylamide present in said emulsion so as to adjust the pH of said emulsion to a level of from 3.0–5.5;
   C. Heating the resultant water-in-oil emulsion to a temperature of from about 60°–90° C. for about 2–20 hours; and then,
   D. Recovering a stabilized water-in-oil emulsion of the quaternary salt of poly trimethylamino methylol acrylamide.

5. The stabilized water-in-oil emulsion of a watersoluble quaternary salt of poly trimethylamino methylol acrylamide of claim 4 wherein from 10–50 mole percent of orthophosphorus acid based on the quaternary salt of poly trimethylamino methylol acrylamide present in the emulsion is added to the water-in-oil emulsion is step E.

6. A method for the stabilization of aqueous solutions of water-soluble quaternary salts of poly trimethylamino methylol acrylamide which comprises:
   A. Adding with mixing to said aqueous solution containing 5–50% by weight of a water-soluble quaternary salt of poly trimethlamino methylol acrylamide from 5–80 mole percent of orthophosphorus acid based on the quaternary salt of poly trimethylamino methylol acrylamide present in said solution so as to adjust the pH of said solution to a level of from 3.0–5.5;
   B. Recovering a stabilized aqueous solution of the quaternary salt of poly trimethylamino methylol acrylamide.

7. The method of claim 6 wherein 10–50 mole percent of orthophosphorus acid is added based on the quaternary salt of poly trimethylamino methylol acrylamide present in the solution.

* * * * *